July 30, 1929.  W. ABBY  1,722,833
EXTERMINATOR
Filed Nov. 18, 1927
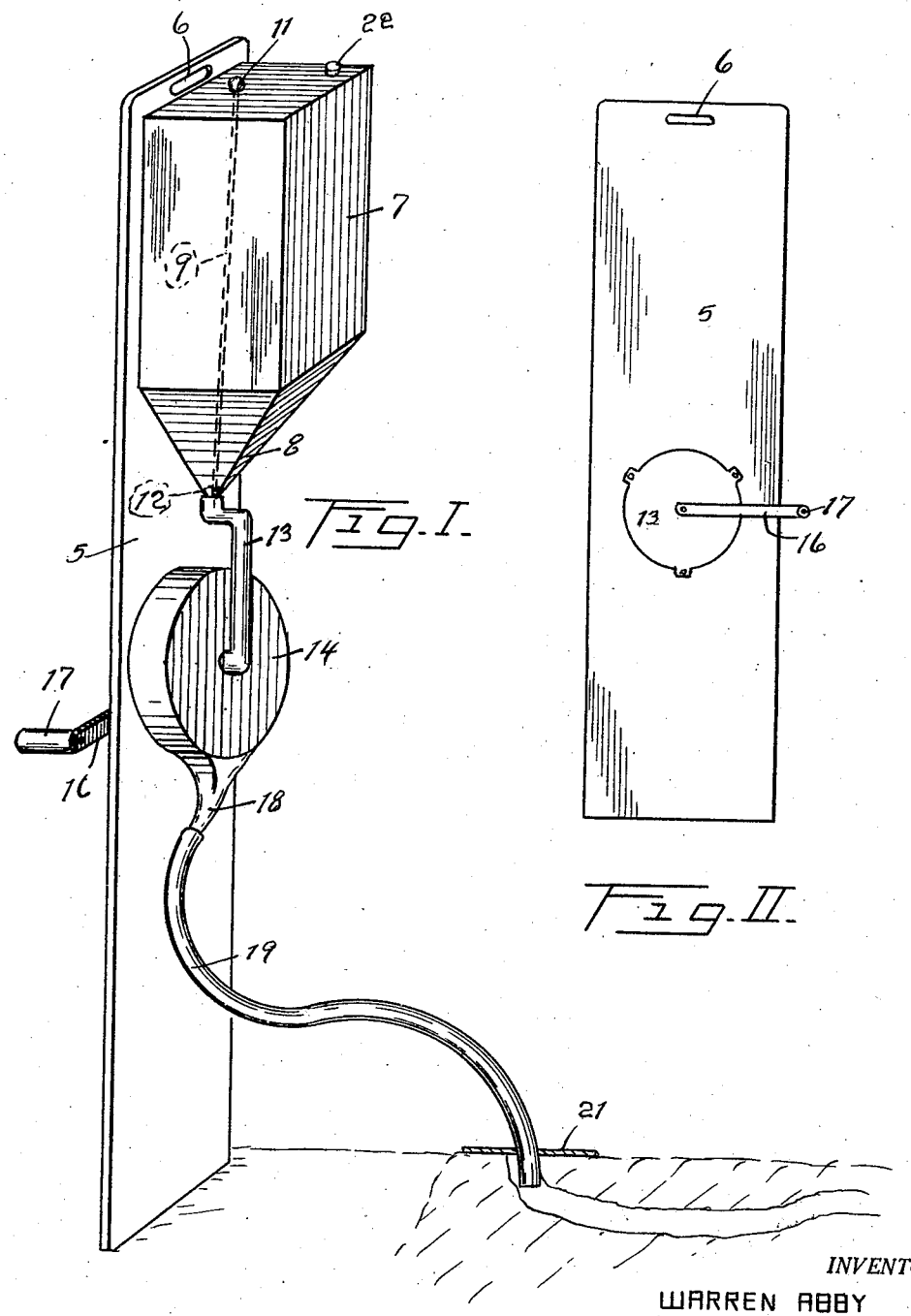
INVENTOR.
WARREN ABBY
BY *Victor J Evans*
ATTORNEY Patented July 30, 1929.

1,722,833

UNITED STATES PATENT OFFICE.

WARREN ABBY, OF MARINA, CALIFORNIA, ASSIGNOR OF THIRTY-SEVEN AND ONE-HALF PER CENT TO FREDERICK C. ROCKWELL, OF CARMEL, CALIFORNIA.

EXTERMINATOR.

Application filed November 18, 1927. Serial No. 234,223.

This invention relates to improvements in exterminators and has particular reference to a device for killing rodents and other similar burrowing animals.

The principal object of this invention is to produce a device which may be readily transported from place to place for the purpose of applying the killing agent.

Another object is to produce a device of this character which is simple to operate and therefore one which may be used by an unskilled person.

A further object is to produce a device which is sturdy in construction and therefore one which will not be easily deranged.

A still further object is to produce a device which is economical to manufacture.

Other objects and advantages will be apparent during the course of the following description.

In the accompanying drawings forming a part of this specification and in which like numerals are employed to designate like parts throughout the same, Figure 1 is a perspective view of my device as the same would appear in use, and Figure 2 is a rear elevation of my device on a reduced scale.

Burrowing animals are hard to exterminate due to the fact that they burrow rapidly and sometime are a considerable distance from the opening to the burrow. It is therefore necessary to provide some means whereby the killing agent may be forcibly driven into the burrow so that it will reach the furthest end of the burrow or wherever the animal may be.

It is with this object in view that I have devised a very simple device wherein a container holds the killing agent, which killing agent may be delivered to a blower from which blower the deadly fumes may be delivered through a flexible pipe to the burrow.

In the accompanying drawings wherein for the purpose of illustration is shown a preferred embodiment of my invention the numeral 5 designates a carrier board which may be of any convenient size and is preferably provided with a handhold 6 at its upper extremity so that the same may be readily transported. To this carrier board I attach a tank 7 which tank has a funnel shaped bottom 8. Within the tank 7 is positioned a rod 9 which rod extends through the upper portion of the tank and carries a ball valve 11 thereon. A valve 12 is secured to the lower end of the rod and is adapted to close the discharge end of the funnel 8. This funnel has secured thereto a pipe 13, which pipe leads to the center of the blower, the casing of which is designated by the numeral 14. This blower may be of any well known form of blower construction properly geared to give the desired speed and provided with a crank 16 and a handle 17. The blower delivers through a nozzle 18 to a flexible pipe 19.

A disc 21 is movably secured on the end of the pipe 19 and when in use this disc is adapted to rest upon the ground in such a manner that the opening to the animal's burrow will be entirely sealed while the end of the pipe 19 is therein.

With a device constructed in accordance with my invention a killing agent such as carbon-bisulphide is placed within the tank 7 through a filler cap 22. After the tank has been filled and the cap replaced, the operator carries the device as a whole to the place of use. The end of the pipe 19 is inserted in the burrow in such a manner that the disc 21 contacts the ground and cuts off all communication between the burrow and the outer atmosphere.

The valve 11 is now raised with the result that the valve 12 is also raised, due to the fact that both valves are connected to the rod 9. The raising of the valve 11 permits air to enter the tank 7 and at the same time the raising of the valve 12 allows the killing agent to flow from the tank 7 into the pipe 13 and to the blower 14. At the same time the handle 17 is rotated so that the blower functions with the result that the air becomes charged with the killing agent and is discharged through the pipe 19 into the burrow.

It will thus be seen that I have produced a very simple device, and one which will accomplish all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, a carrier board, a tank positioned on said carrier board at a point adjacent its upper extremity, said tank having a funnel shaped lower extremity, a blower positioned beneath said tank and mounted on the same side of said board as said tank, a pipe connecting said blower and said funnel shaped extremity, means for conducting the products of said blower to a remote point, a crank for rotating said blower, said crank being positioned on the opposite side of said board from said blower, a rod extending through said tank, a valve positioned on the lower extremity of said rod, a valve positioned on the upper extremity of said rod, both of said valves being adapted to close and open simultaneously.

In testimony whereof I affix my signature.

WARREN ABBY.